US012685885B2

(12) United States Patent
Lupien

(10) Patent No.: US 12,685,885 B2
(45) Date of Patent: Jul. 21, 2026

(54) RESTAURANT SUPPRESSION SYSTEM WITH PHASED AGENT DELIVERY

(71) Applicant: KIDDE-FENWAL, LLC, Ashland, MA (US)

(72) Inventor: Richard Lawrence Lupien, Grafton, MA (US)

(73) Assignee: Kidde Fenwal, LLC, Ashland, MA (US)

( * ) Notice: Subject to any disclaimer, the term of this patent is extended or adjusted under 35 U.S.C. 154(b) by 281 days.

(21) Appl. No.: 18/339,198

(22) Filed: Jun. 21, 2023

(65) Prior Publication Data

US 2024/0009492 A1 Jan. 11, 2024

Related U.S. Application Data

(60) Provisional application No. 63/367,664, filed on Jul. 5, 2022.

(51) Int. Cl.

*A62C 5/00* (2006.01)
*A62C 35/02* (2006.01)
*A62C 3/00* (2006.01)

(52) U.S. Cl.

CPC ............ *A62C 5/008* (2013.01); *A62C 35/023* (2013.01); *A62C 3/006* (2013.01)

(58) Field of Classification Search

CPC ..... A62C 5/008; A62C 35/023; A62C 13/003; A62C 35/13; A62C 5/002; A62C 37/04; A62C 37/10

See application file for complete search history.

(56) References Cited

U.S. PATENT DOCUMENTS

| | | | | | |
|---|---|---|---|---|---|
| 2,287,873 | A * | 6/1942 | Geertz | A62C 99/0027 | 169/56 |
| 2002/0027143 | A1* | 3/2002 | Schoenrock | A62C 31/02 | 222/200 |
| 2005/0001065 | A1* | 1/2005 | Senecal | B05B 1/341 | 239/461 |
| 2011/0259617 | A1* | 10/2011 | Lelic | A62C 31/05 | 169/37 |
| 2016/0089555 | A1* | 3/2016 | Glen | B61D 15/00 | 105/238.1 |

FOREIGN PATENT DOCUMENTS

| | | | |
|---|---|---|---|
| EP | 0878212 | A2 | 11/1998 |
| FR | 2882523 | A1 | 9/2006 |
| WO | 2018130566 | A1 | 7/2018 |

OTHER PUBLICATIONS

Extended European Search report issued in corresponding EP application No. 23182665.2, mailed on Mar. 31, 2026.

* cited by examiner

*Primary Examiner* — Christopher R Dandridge
(74) *Attorney, Agent, or Firm* — Honigman LLP; Andrew J. Boes

(57) ABSTRACT

A fire suppression system is disclosed. The fire suppression system comprises a first storage cylinder configured for storing a first suppression solution. The system comprises a second storage cylinder operatively connected to the first storage cylinder. The second storage cylinder is configured for storing a second suppression solution, wherein in response to a detection of a fire condition, the first storage cylinder is configured to release the first solution into the second storage cylinder to cause the second solution to be delivered first during a first phase of a discharge.

10 Claims, 3 Drawing Sheets

RESTAURANT SUPPRESSION SYSTEM WITH PHASED AGENT DELIVERY

CROSS REFERENCE TO A RELATED APPLICATION

The application claims the benefit of U.S. Provisional Application No. 63/367,664 filed Jul. 5, 2022, the contents of which are hereby incorporated in their entirety.

BACKGROUND

The invention relates generally to fire suppression systems and, more specifically, to phased agent delivery in fire suppression systems.

Current fire suppression systems use a fixed delivery system where a single high potassium salt agent is released from the cylinder(s) in response to fire detection. This may not be an optimum solution for extinguishing, cooling, and/or prevention of reignition.

BRIEF DESCRIPTION

Aspects of the disclosure relate to methods, apparatuses, and/or systems for phased agent delivery in fire suppression systems.

In some embodiments, a fire suppression system is disclosed. The fire suppression system comprises a first storage cylinder configured for storing a first suppression solution. The system comprises a second storage cylinder operatively connected to the first storage cylinder. The second storage cylinder is configured for storing a second suppression solution, wherein in response to a detection of a fire condition, the first storage cylinder is configured to release the first solution into the second storage cylinder to cause the second solution to be delivered first during a first phase of a discharge.

In some embodiments, the first solution and the second solution are gradually mixed during the discharge.

In some embodiments, a mixture of the first solution and the second solution is delivered at a second phase of the discharge.

In some embodiments, the first solution is water, and the second solution is a wet chemical agent.

In some embodiments, the second solution is a water-based potassium solution.

In some embodiments, the first solution comprises a first percentage of salts mixture, and the second solution comprises a second percentage of the salts mixture, wherein the first percentage of the salts mixture is lower than the second percentage of the salts mixture.

In some embodiments, the first solution comprises a first percentage of a first salts mixture, and the second solution comprises a second percentage of a second salts mixture, wherein the first percentage of the first salts mixture is lower than the second percentage of the second salts mixture.

In some embodiments, a method for phased agent delivery is provided. The method comprises providing a first storage cylinder, the first storage cylinder configured for storing a first suppression solution; operatively connecting a second storage cylinder to the first storage cylinder, the second storage cylinder configured for storing a second suppression solution; and in response to a detection of a fire condition, releasing the first solution into the second storage cylinder to cause the second solution to be delivered first during a first phase of a discharge.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

Figure 1:
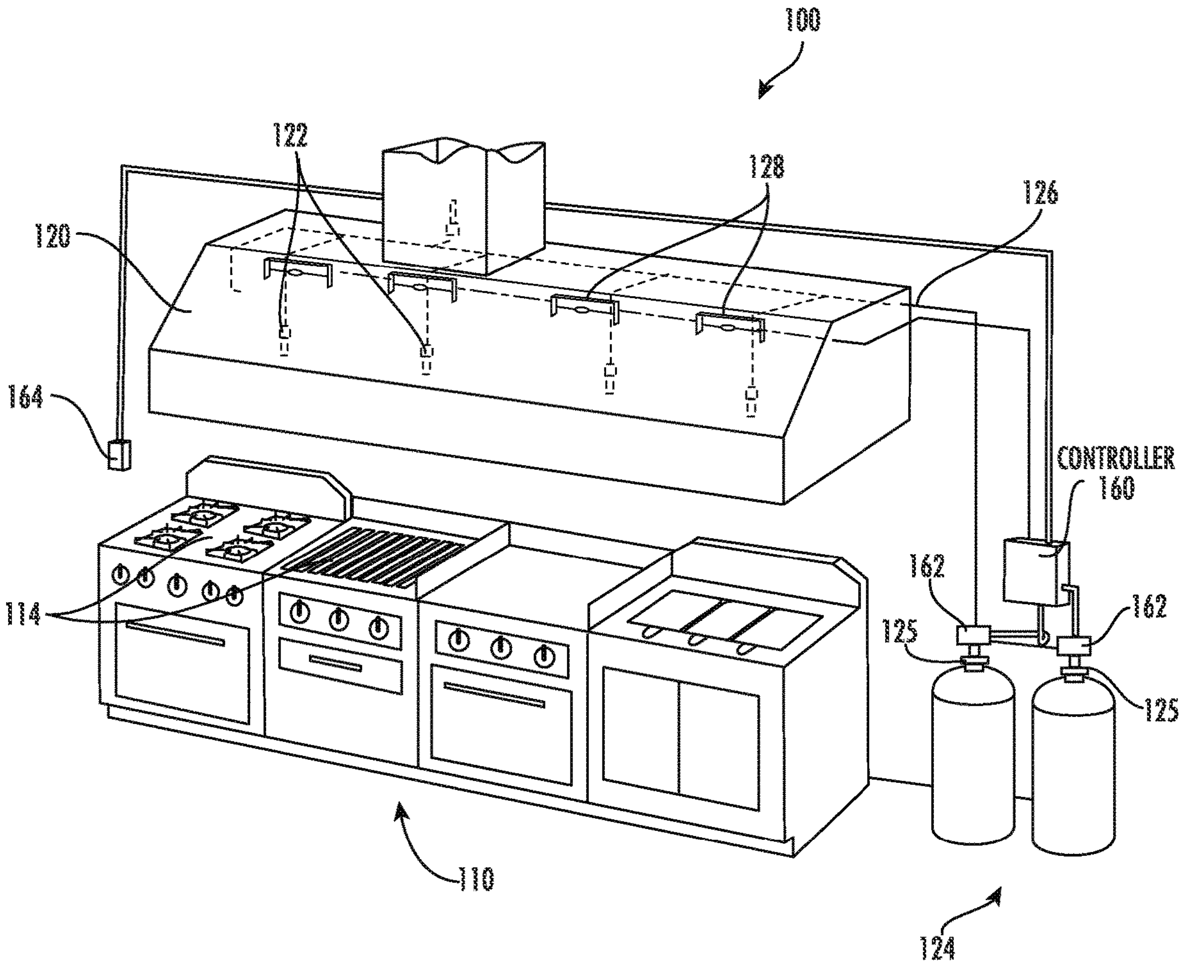
FIG. 1 is a schematic illustration of an exemplary fire suppression system, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Generally, fire suppression systems are configured to discharge a suppression agent (e.g., in response to detecting flames/fire). Traditionally, a liquid agent is discharged from a cylinder at a high flow rate, which decreases gradually during discharge in response to a decay in pressure in the cylinder. The liquid agent is generally a solution of a fixed percentage of a potassium salt and water. In operation (in an example applied to fire conditions in cooking appliance with hot oil), the suppression agent reacts with cooking oil to form a saponification layer (e.g., a foam layer) which prevents (or at least mitigates) the oil from reigniting. Once the foam dissipates, if the oil is cool enough, it may not have the ability to reignite. However, in some cases, delivering a liquid agent having a fixed amount of constituents may not offer an effective solution for extinguishing fire, cooling the oil, and preventing re-ignition. As described below, by changing the constituents of the liquid agent, it is possible to increase the amount of effective agent reaching the oil, thereby improving the fire suppression performance.

The present disclosure, in accordance with some embodiments, describes a phased agent delivery fire suppression system 100. In some embodiments, system 100 may include a first storage cylinder for storing a first solution holding a low concentration of suppression agent. The first cylinder is operatively connected to a second storage cylinder holding a second solution having a high concentration of fire suppression agent (e.g., a wet chemical suppression agent). For example, in some embodiments, the solution in the first cylinder may be water, and the solution in the second cylinder may be a high potassium to water percentage solution. System 100 may be configured such that, responsive to detecting a fire condition, the first solution from the first cylinder is released into the second cylinder to cause the second solution to be delivered first during discharge. As the first solution continues to be released into the second cylinder, the concentration of the fire suppression agent in the resulting mixture (of the first and the second solutions) is gradually reduced. The resulting mixture is delivered for the rest of the discharge. The phased agent delivery may optimize the effectiveness of a single discharge in containing the fire condition and preventing reignition: delivering a solution with high concentration of suppression agent first may help in knocking down the flames quickly; and continuing the discharge with a solution having a lower concentration of suppression agent may help the cooling operation to prevent reignition. Accordingly, the phased agent delivery systems and methods of the present disclosure may provide an effective way to suppress the fire conditions with a reduced total quantity of suppression agent by using the available agent more efficiently. Additionally, the gradual reduction in the suppression agent concentration may improve oil temperature reduction and minimize saponification and agent spillover.

With reference now to FIG. 1, an example of a system 100 for delivering a fire suppression agent to one or more cooking appliances 110 is illustrated. The fire suppression system 100 may be located separate or remotely from the cooking appliance 110, such as within a vent hood 120, or alternatively, may be integrated or housed at least partially within a portion of the cooking appliance 110. It should be understood that the configuration of the fire suppression system 100 may vary based on the overall structural design of the cooking appliance 110. The fire suppression system 100 may include one or more spray nozzles 122 associated with the cooking appliance 110 and a source of fire suppression agent 124. In embodiments including a plurality of cooking appliances 110, one or more spray nozzles 122 may be dedicated to each cooking appliance 110, or alternatively, one or more evenly spaced spray nozzles 122 may be used for all of the cooking appliances 110. In some embodiments, source of fire suppression agent 124 may be arranged in fluid communication with the nozzles 122 via an agent delivery path defined by a delivery piping system 126. In the event of a fire, the fire suppression agent is allowed to flow through the delivery piping system 126 to the one or more spray nozzles 122 for release directly onto an adjacent cooking hazard area 114 of the one or more cooking appliances 110.

In some embodiments, in operation, the fire suppression system 100 may be actuated in response to a fire sensing device (illustrated schematically at 128), such as a smoke detector or a heat sensor, for example. In response to detecting heat or smoke exceeding an allowable limit, a controller 160 may be configured to direct a signal to an actuator 162 to open a valve 125 to allow the fire suppression agent to flow from the source 124 to the nozzles 122. Alternatively, or in addition, the fire suppression system 20 includes a manual activation system 164, also referred to herein as a pull station, configured to actuate the controller 160 to activate the valve 125 to initiate operation of the fire suppression system 100.

In some embodiments, source of fire suppression agent 124 may be arranged in fluid communication with the nozzles 122 via an agent delivery path defined by a delivery piping system 126. In the event of a fire, the fire suppression agent may be configured to flow through the delivery piping system 126 to the one or more spray nozzles 122 for release directly onto an adjacent cooking hazard area 114 of the one or more cooking appliances 110. In operation, in some embodiments, in response to heat or smoke exceeding an allowable limit, a controller 160 may be configured to direct a signal to an actuator 162 to open a control device 125 to allow the fire suppression agent to flow from the source 124 to the nozzles 122.

Figure 2:
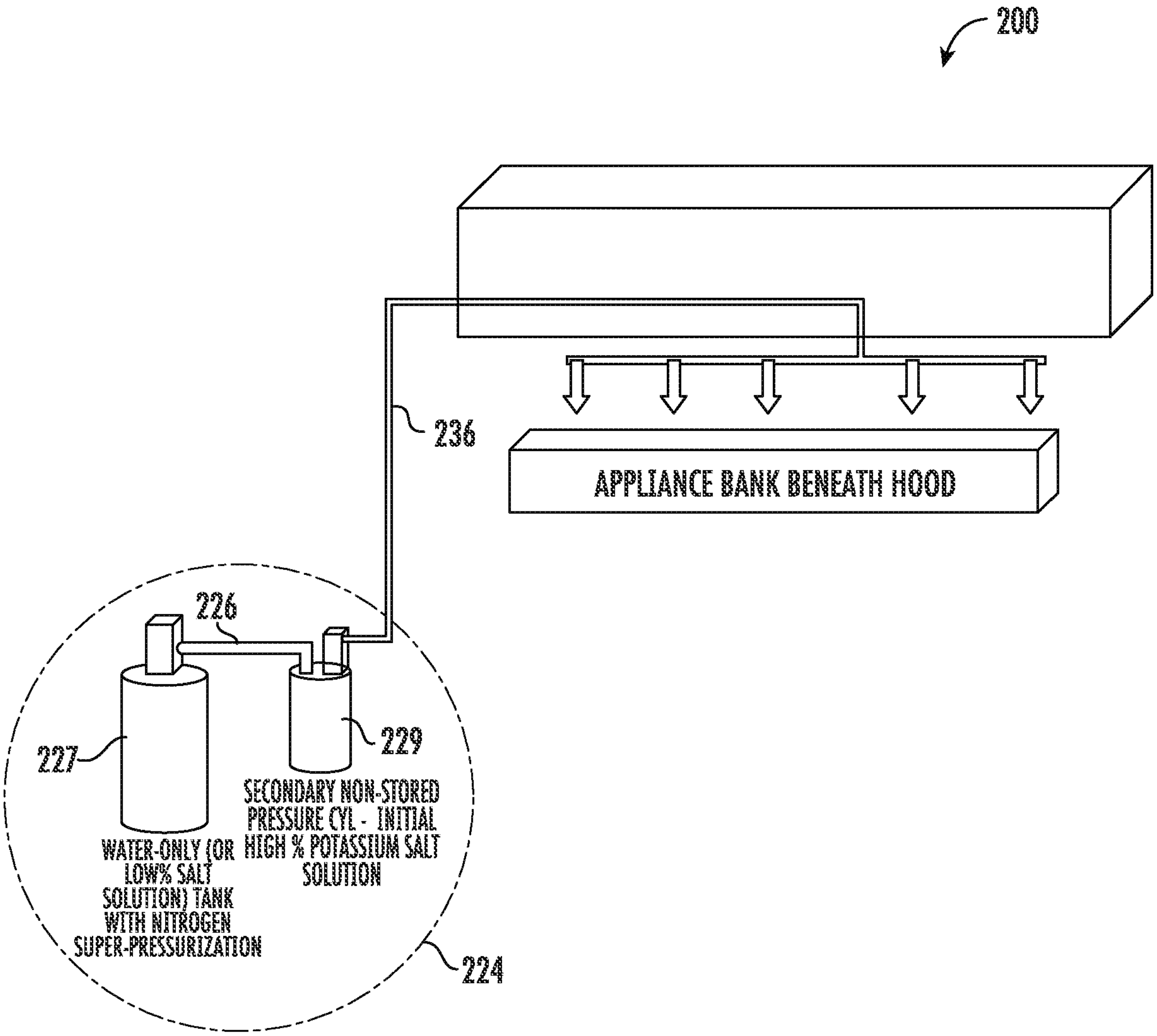
FIG. 2 is a schematic illustration of an exemplary phased agent delivery system, in accordance with one or more embodiments.

FIG. 2 is a schematic illustration of an exemplary phased delivery system 200, in accordance with one or more embodiments. Source of fire suppression agent 224 may include a first cylinder 227 operatively connected to a second cylinder 229. In some embodiments, first cylinder 227 may be operatively connected to second cylinder 229 via piping 236. In some embodiments, first cylinder 227 may be configured to store a first solution and second cylinder 229 may be configured to hold a second solution. In some embodiments, the first solution may be water. In some embodiments, the first solution may be a salt solution having a low percentage of salts by weight. For example, in some embodiments, the first solution may include less than about 20% of salts by weight. In some embodiments, the first solution may include between about 5 and 15% of salts by weight.

In some embodiments, the second solution, stored in the second cylinder, may be a high salt mixture. For example, the second solution may be a salt solution having a percentage of salts higher than the percentage of salts in the first solution. For example, in some embodiments, the second solution may include more than about 20% of salts by weight. In some embodiments, the second solution may include between about 35 and 50% of salts by weight. In some embodiments, the salts (in the first and/or second solution) may be one or more of potassium carbonate, potassium bicarbonate, potassium chloride, potassium sulfate, potassium acetate, potassium tartrate, potassium citrate, sodium carbonate, sodium bicarbonate, sodium chloride, sodium sulfate, and/or other salts.

In some embodiments, the first and second solutions may include the same salts at different concentrations. For example, in these cases, the first solution may include a first percentage of a salts mixture, and the second solution may include a second percentage of the same salts mixture, such that the first percentage of the salts mixture (in the first solution) is lower than the second percentage of the salts mixture (in the second solution). In some embodiments, the first solution and second solutions may have different compositions (e.g., salts in the first solution are different than the salts in the second solution). For example, in these cases, the first solution may include a percentage of a first salts mixture, and the second solution may include a percentage of a second salts mixture, such that the percentage of the first salts mixture (in the first solution) is lower than the percentage of the second salts mixture (in the second solution).

In some embodiments, the first solution may act as a propellant for facilitating the movement of the second solution through the delivery piping system 236. In operation (e.g., in an example applied to fire conditions in cooking appliance with hot oil), first cylinder 227 may be configured to release the first solution into second cylinder 229 (via piping 226) to force the second solution to be discharged. This may cause the second solution (e.g., the high salt solution) to be delivered first to control the fire condition. During this first phase, the second solution may react with cooking oil to form a saponification layer. As the first solution (e.g., water) from cylinder 227 continues to be delivered to cylinder 229, this may cause the second solution to be gradually diluted. The resulting diluted mixture is delivered (via piping 236) for an extended duration (second phase) for the rest of the discharge to cool the oil and/or prevent re-ignition. This may be advantageous because it may provide a steady gradual agent concentration reduction at the nozzles without the use of a mixing valve or other controls. Additionally, the gradual reduction in the concentration of the suppression agent may help minimize saponification and agent spillover.

It is to be noted that the phased delivery system described in FIG. 2 is not intended to be limiting. Other configurations may be considered and are consistent with the present disclosure. For example, in some embodiments, a fire suppression system may include one or more fire suppression agent sources similar to fire suppression source 224 (described herein). In some embodiments, fire suppression source 224 may include additional cylinders (e.g., water cylinders, low salt mixture cylinders, and/or high salt mixture cylinders).

Figure 3:
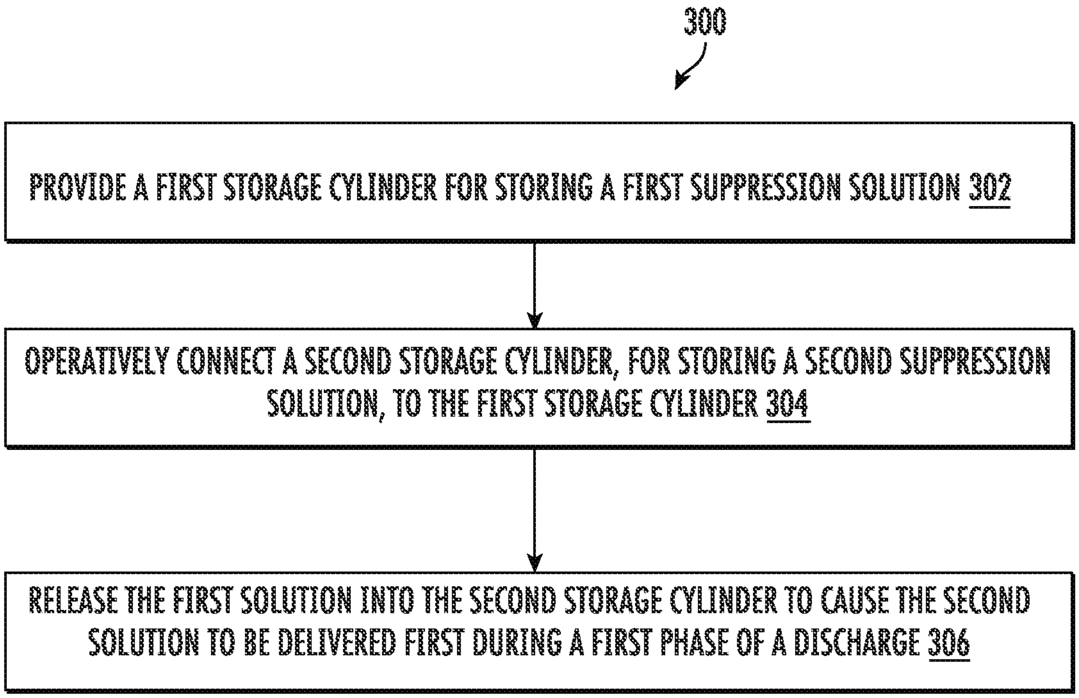
FIG. 3 shows a flow diagram of an exemplary method for phased agent delivery, in accordance with one or more embodiments.

FIG. 3 is a flow diagram illustrating an example of a method 300 for fire suppression, in accordance with one or more embodiments of the present disclosure. The operations of method 300 presented below are intended to be illustrative. In some implementations, method 300 may be accomplished with one or more additional operations not described and/or without one or more of the operations discussed. Additionally, the order in which the operations of method 300 are illustrated in FIG. 3 and described below is not intended to be limiting.

At an operation 302 of method 300, a first storage cylinder configured for storing a first suppression solution is provided. In some embodiments, operation 302 may be performed by a cylinder similar to first cylinder 225 (shown in FIG. 2 and described herein).

At an operation 304 of method 300, a second storage cylinder operatively is operatively connected to the first storage cylinder. The second cylinder is configured for storing a second suppression solution. In some embodiments, operation 304 may be performed by a cylinder similar to second cylinder 226 (shown in FIG. 2 and described herein).

At an operation 306 of method 300, in response to a detection of a fire condition, the first solution is released into the second storage cylinder to cause the second solution to be delivered first during a first phase of a discharge.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A fire suppression system comprising:

a first storage cylinder configured for storing a first suppression solution under pressure, the first suppression solution configured to prevent a fire reignition; and a second storage cylinder operatively connected to the first storage cylinder, the second storage cylinder configured for storing a second suppression solution the second suppression solution configured to extinguish a fire;

a first piping coupled on one end to a discharge nozzle;

a second piping connecting the first storage cylinder to the second storage cylinder, wherein wherein in response to a detection of a fire condition, the first storage cylinder is configured to release the first solution through the second piping into the second storage cylinder under pressure causing the second solution to be delivered first through the first piping to the discharge nozzle first during a first phase of a discharge and wherein as the first suppression solution continues to be released into the second storage cylinder a resulting mixture of the first suppression solution and the second suppression solution is formed in a second phase of the discharge, wherein a concentration of the first suppression solution increases as a concentration of the second suppression solution decreases over time in the resulting mixture so as to provide a discharge wherein the second suppression solution extinguishes the fire and the resulting mixture introduces a greater concentration of the first suppression solution to prevent the fire reignition over time.

2. The fire suppression system of claim 1, wherein the first solution is water, and the second solution is a wet chemical agent.

3. The fire suppression system of claim 2, wherein the second solution is a water-based potassium solution.

4. The fire suppression system of claim 1, wherein the first solution comprises a first percentage of salts mixture, and the second solution comprises a second percentage of the salts mixture, wherein the first percentage of the salts mixture is lower than the second percentage of the salts mixture.

5. The fire suppression system of claim 1, wherein the first solution comprises a first percentage of a first salts mixture, and the second solution comprises a second percentage of a second salts mixture, wherein the first percentage of the first salts mixture is lower than the second percentage of the second salts mixture.

6. A method for phased agent delivery, the method comprising:

providing a first storage cylinder, the first storage cylinder configured for storing a first suppression solution under a first pressure;

operatively connecting a second storage cylinder to the first storage cylinder, the second storage cylinder configured for storing a second suppression solution under a second pressure that is less than the first pressure; and in response to a detection of a fire condition, releasing the first solution into the second storage cylinder to cause the second solution to be delivered first during a first phase of a discharge under the first pressure wherein during a second phase of the discharge, the first suppression solution is mixed with the second suppression solution is formed, wherein a concentration of the first suppression solution increases as a concentration of the second suppression solution decreases over time so as to provide a discharge wherein the second suppression solution extinguishes the fire and the resulting mixture introduces a greater concentration of the first suppression solution to prevent reignition over time.

7. The method of claim 6, wherein the first solution is water, and the second solution is a wet chemical agent.

8. The method of claim 7, wherein the second solution is a water-based potassium solution.

9. The method of claim 6, wherein the first solution comprises a first percentage of salts mixture, and the second solution comprises a second percentage of the salts mixture, wherein the first percentage of the salts mixture is lower than the second percentage of the salts mixture.

10. The method of claim 6, wherein the first solution comprises a first percentage of a first salts mixture, and the second solution comprises a second percentage of a second salts mixture, wherein the first percentage of the first salts mixture is lower than the second percentage of the second salts mixture.

* * * * *